(12) United States Patent
Jackson et al.

(10) Patent No.: US 11,288,509 B2
(45) Date of Patent: Mar. 29, 2022

(54) FALL DETECTION AND ASSISTANCE

(71) Applicant: TOYOTA RESEARCH INSTITUTE, INC., Los Altos, CA (US)

(72) Inventors: Astrid Jackson, Mountain View, CA (US); Brandon Northcutt, Arlington, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 126 days.

(21) Appl. No.: 16/681,366

(22) Filed: Nov. 12, 2019

(65) Prior Publication Data
US 2021/0142057 A1   May 13, 2021

(51) Int. Cl.
*G06K 9/00* (2006.01)
*B25J 9/00* (2006.01)

(52) U.S. Cl.
CPC ........ *G06K 9/00664* (2013.01); *B25J 9/0003* (2013.01); *G06K 9/00214* (2013.01)

(58) Field of Classification Search
CPC ............. G06K 9/00664; G06K 9/00214; B25J 9/0003
See application file for complete search history.

(56) References Cited

U.S. PATENT DOCUMENTS

| | | | | |
|---|---|---|---|---|
| 10,937,178 B1* | 3/2021 | Srinivasan | ................ | G06T 7/70 |
| 2007/0192910 A1* | 8/2007 | Vu | ........................... | B25J 19/06 700/245 |
| 2007/0269077 A1* | 11/2007 | Neff | ......................... | G01S 7/41 382/103 |
| 2011/0112839 A1* | 5/2011 | Funakoshi | ............ | G10L 15/083 704/249 |
| 2012/0173018 A1* | 7/2012 | Allen | .................... | G05D 1/0274 700/245 |
| 2014/0050455 A1* | 2/2014 | Ni | ......................... | H04N 7/181 386/224 |
| 2014/0214255 A1* | 7/2014 | Dolgov | ................ | G05D 1/0248 701/23 |
| 2014/0288705 A1* | 9/2014 | Yun | ...................... | B62D 57/032 700/246 |
| 2017/0157769 A1* | 6/2017 | Aghamohammadi | | ...................... G05D 1/0217 |
| 2018/0012370 A1* | 1/2018 | Aghamohammadi | .... | G06T 7/50 |
| 2018/0107226 A1* | 4/2018 | Yang | .................... | G05D 1/0246 |
| 2019/0197861 A1* | 6/2019 | Tunnell | ................ | G08B 27/001 |
| 2019/0286921 A1* | 9/2019 | Liang | ........................ | G06T 7/70 |
| 2019/0340775 A1* | 11/2019 | Lee | ....................... | G05D 1/0212 |

(Continued)

OTHER PUBLICATIONS

Hotze, Wolfgang, "Robotic First Aid: Using a mobile robot to localise and visualise points of Interest for first aid," 2016 (Dissertation, Halmstad University) http://um.kb.se/resolve?urn=urn:nbn:se:hh:diva-32324.

(Continued)

*Primary Examiner* — Ming Y Hon
(74) *Attorney, Agent, or Firm* — Seyfarth Shaw LLP (57) ABSTRACT

A method for controlling a robotic device based on observed object locations is presented. The method includes observing objects in an environment. The method also includes generating a probability distribution for locations of the observed objects. The method further includes controlling the robotic device to perform an action when an object is at a location in the environment with a location probability that is less than a threshold.

20 Claims, 8 Drawing Sheets

(56) References Cited

U.S. PATENT DOCUMENTS

| | | | | |
|---|---|---|---|---|
| 2020/0017317 A1* | 1/2020 | Yap | .................... | B65G 1/1376 |
| 2020/0053325 A1* | 2/2020 | Deyle | .................... | H04N 7/185 |
| 2020/0086482 A1* | 3/2020 | Johnson | ................ | B25J 9/1674 |
| 2020/0174481 A1* | 6/2020 | Van Heukelom | .... | G05D 1/0088 |
| 2020/0207356 A1* | 7/2020 | Chandra | ............. | G05D 1/0248 |
| 2020/0207375 A1* | 7/2020 | Mehta | ................. | G05D 1/0212 |
| 2020/0333142 A1* | 10/2020 | Wang | .................. | G05D 1/0257 |
| 2020/0410063 A1* | 12/2020 | O'Malley | ........... | G06F 11/3058 |
| 2020/0410259 A1* | 12/2020 | Srinivasan | ................ | G06T 7/73 |
| 2021/0096571 A1* | 4/2021 | Modalavalasa | ...... | G05D 1/0214 |

OTHER PUBLICATIONS

Leone, Alessandro, et al. ,"A multi-sensor approach for People Fall Detection in home environment", Workshop on Multi-camera and Multi-modal Sensor Fusion Algorithms and Applications—M2SFA2 2008, Oct. 2008, Marseille, France.

Rhuma, Adel, "Intelligent computer vision processing techniques for fall detection in enclosed environments", Feb. 2014, (Doctoral Dissertation, Loughborough University), https://dspace.lboro.ac.uk/2134/15108.

Debard, G., et al., "Camera-based fall detection using a particle filter", 37th Annual International Conference of the IEEE Engineering in Medicine and Biology Society (EMBC), IEEE, 2015.

Diraco, Giovanni, et al., "An active vision system for fall detection and posture recognition in elderly healthcare", Proceedings of the Conference on Design, Automation and Test in Europe, 2010, pp. 1536-1541. https://dl.acm.org/citation.cfm?id=1871297.

\* cited by examiner

FALL DETECTION AND ASSISTANCE

BACKGROUND

Field

Certain aspects of the present disclosure generally relate to object detection and, more particularly, to a system and method for detecting an out of place object based on a spatial and temporal knowledge of objects in an environment.

Background

A robotic device may use one or more sensors, such as a camera, to identify objects in an environment. A location of each identified object may be estimated. Additionally, a label may be assigned to each localized object. In conventional object localization systems, each estimated object location may be stored in a database along with an estimation time stamp.

Conventional object detection systems may be limited to detecting objects in an environment. It is desirable to improve an object detection system's ability to detect an out of place object. It is also desirable for robotic systems to perform an action upon detecting an out of place object.

SUMMARY

In one aspect of the present disclosure, a method for controlling a robotic device based on observed object locations is disclosed. The method includes observing objects in an environment. The method also includes generating a probability distribution for locations of the observed objects. The method further includes controlling the robotic device to perform an action when an object is at a location in the environment with a location probability that is less than a threshold.

In another aspect of the present disclosure, a non-transitory computer-readable medium with non-transitory program code recorded thereon is disclosed. The program code is for controlling a robotic device based on observed object locations. The program code is executed by a processor and includes program code to observe objects in an environment. The program code also includes program code to generate a probability distribution for locations of the observed objects. The program code further includes program code to control the robotic device to perform an action when an object is at a location in the environment with a location probability that is less than a threshold.

Another aspect of the present disclosure is directed to an apparatus for controlling a robotic device based on observed object locations. The apparatus having a memory and one or more processors coupled to the memory. The processor(s) is configured to observe objects in an environment. The processor(s) is also configured to generate a probability distribution for locations of the observed objects. The processor(s) is further configured to control the robotic device to perform an action when an object is at a location in the environment with a location probability that is less than a threshold.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Conventional systems (e.g., object detection network) that perform visual object classification generate false positive and false negative detections. The false positive and false negative detections reduce an accuracy of the detections. A system or method for visual object detection may be combined with a system or method of estimating the detected object location to analyze the object locations. A detected visual object may be identified by abounding box. The analysis of the object locations may be referred to as a clustering analysis.

Errors may be detected from the clustering analysis. Additionally, true object locations may be estimated based on the clustering analysis. The clustering analysis assumes a static environment and exploits this assumption to count the number of objects in the environment, improve the estimated true location of each object, and reject detections that are not part of a spatial cluster (e.g., false positive detection).

Additionally, or alternatively, objection location estimations may be analyzed using a probability density function. The probability density function (e.g., probability density analysis) does not assume a static environment. The probability density analysis does not use the clustering analysis, object counting, or erroneous detection estimation. In one configuration, a spatial and temporal search for an object may be performed based on the probability density analysis.

The spatial and temporal search of an object may be used to detect an out of place object. For example, a robotic device may detect a human lying down in a location. The location may be a high probability area for a human to lie down (e.g., a bed) or a low probability area (e.g., on a floor near stairs). If the location is a low probability area, the robotic device may assist the human.

A robotic device may use one or more sensors to identify objects in an environment. The sensors may include a red-green-blue (RGB) camera, radio detection and ranging (RADAR) sensor, light detection and ranging (LiDAR) sensor, or another type of sensor. In an image captured by a sensor, a location of one or more identified object may be estimated. Each object's location estimate may be stored along with an estimation time stamp. The estimation time stamp identifies a time when the object was at an estimated location. In one configuration, three-dimensional (3D) object locations are determined by registering detection bounding box centroids with a point cloud produced by a depth camera.

In most systems, images are generated at a number of frames per second, such as ten frames per second. Additionally, each frame may include multiple objects. The number of frames and the number of objects in each frame increase an amount of storage resources used by conventional object detection systems. Additionally, conventional object detection system may use an increased amount of processing resource for processing the images.

Conventional object detection systems may also generate false positive and false negative location estimations. That is, for each object detected in a frame, some detections may be valid, while others some may be invalid.

Aspects of the present disclosure are directed to using a density based clustering function to estimate the number of objects in the environment. The estimate is based on an assumption that the observation density for true object locations will be greater than a high density threshold. Additionally, the observation density for false positive object locations will be less than a low density threshold.

In the current disclosure, for simplicity, a robotic device may be referred to as a robot. Additionally, the objects may include stationary and dynamic objects in an environment. The objects may include man-made objects (e.g., chairs, desks, cars, books, etc.), natural objects (e.g., rocks, trees, animals, etc.), and humans.

Figure 1:
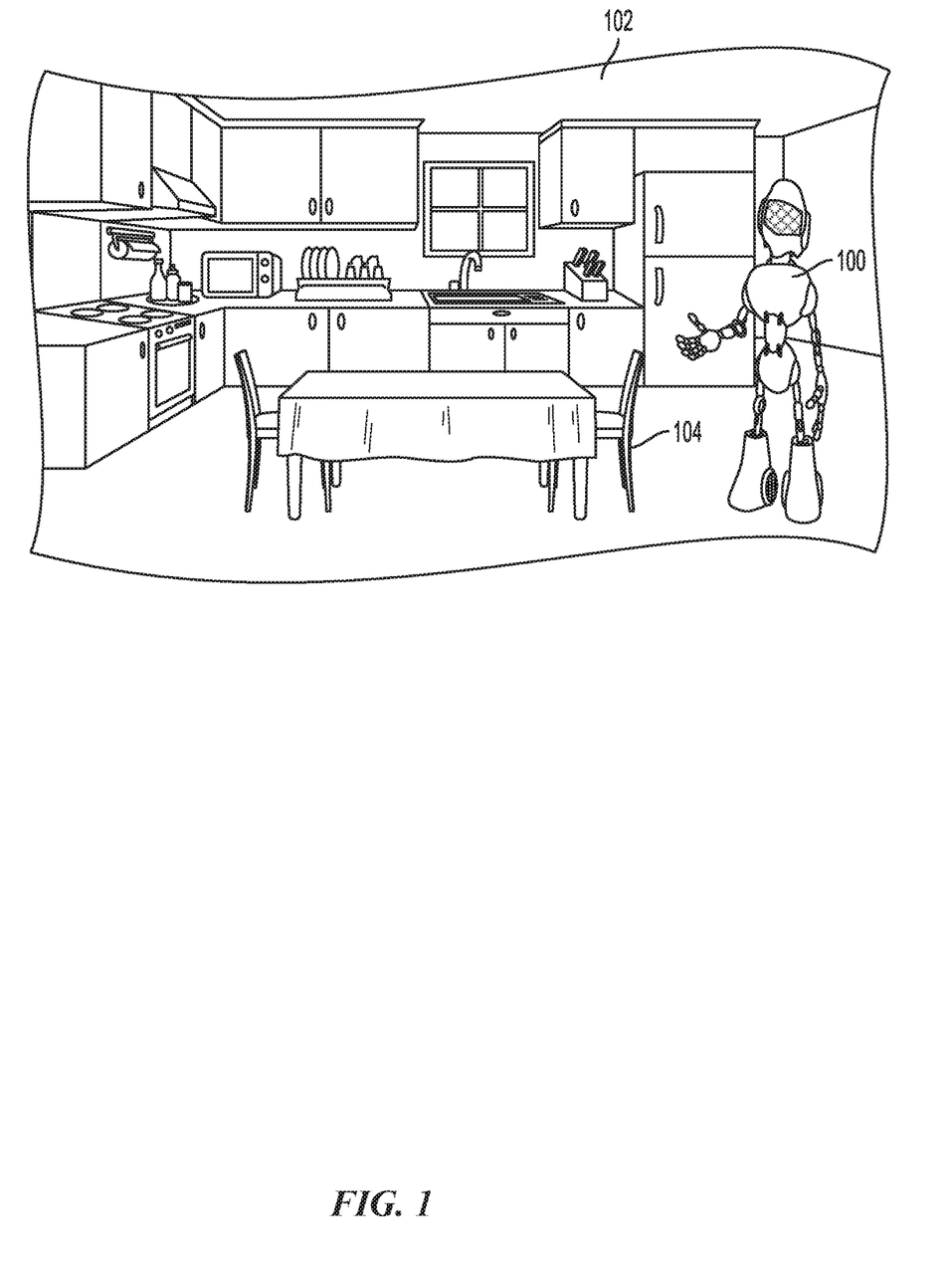
FIG. 1 illustrates an example of a robot in an environment according to aspects of the present disclosure.

FIG. 1 illustrates an example of a robot 100 in an environment 102, according to aspects of the present disclosure. In the example of FIG. 1, the robot 100 is a humanoid robot and the environment 102 is a kitchen. Aspects of the present disclosure are not limited to the humanoid robot. The robot 100 may be any type of autonomous or semi-autonomous device, such as a drone or a vehicle. Additionally, the robot 100 may be in any type of environment.

In one configuration, the robot 100 obtains one or more images of the environment 102 via one or more sensors of the robot 100. The robot 100 may localize one or more objects in each image. Localization refers to determining the location (e.g., coordinates) of the object within the image. In conventional object detection systems, a bounding box may be used to indicate the location of the object in the image. The localized objects may be one or more specific classes of objects, such as chairs 104, or all objects in the image. The objects may be localized via an object detection system, such as a pre-trained object detection neural network.

As discussed, one or more identified objects in an image (e.g., frame) may be localized. In one configuration, object location estimators are observed over time in an environment. Specifically, a clustering analysis may be applied to the object location estimators over various temporal windows (e.g., different time periods).

Figure 2:
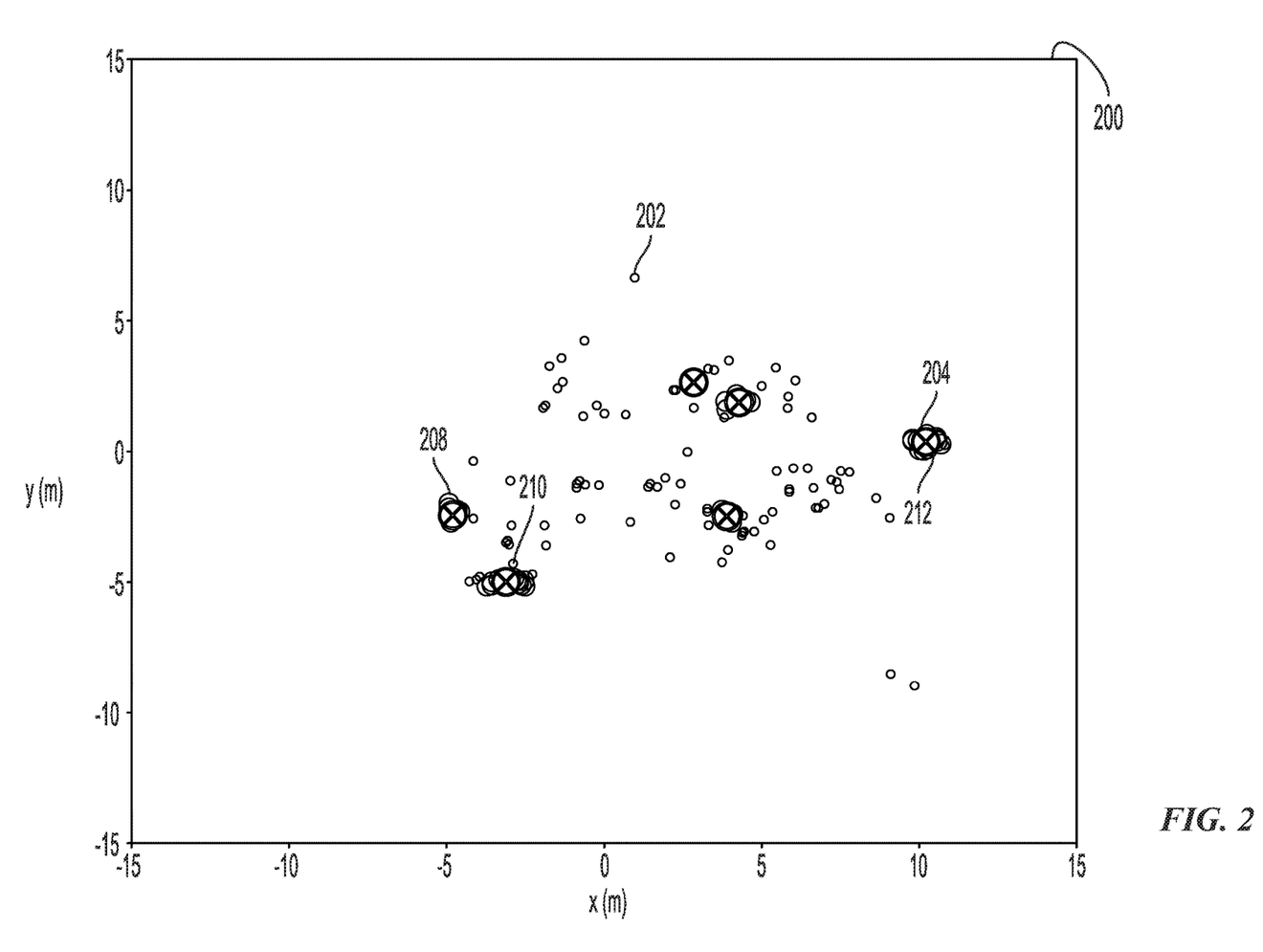
FIG. 2 illustrates an example of a clustering analysis map according to aspects of the present disclosure.

FIG. 2 illustrates an example of a clustering analysis map 200, according to aspects of the present disclosure. In the example of FIG. 2, object location estimators were observed over time in an environment. Each node 202, 208 identifies a location of an estimated location of an object in the environment. As shown in FIG. 2, some nodes 202 (e.g., non-clustered nodes 202) may not be associated with a cluster. Other nodes 208 (e.g., in-clustered nodes 208) may be clustered around a centroid 204. Non-clustered nodes 202 may be considered false positives. For brevity, labels are not provided for each non-clustered node 202 and in-clustered node 208 of FIG. 2.

In the example of FIG. 2, in-clustered nodes 208 may be edge nodes 210 or core nodes 212. A size (e.g., diameter) of an edge in-clustered node 210 is less than a size of core in-clustered node 212. Each edge in-clustered node 210 is associated with one neighbor node, where the distance of the neighbor node is less than a distance threshold. Each core in-clustered nodes 212 is associated with one neighbor node, where the distance of the neighbor node is less than a distance threshold. In one configuration, because the environment is a 3D environment, the centroid 204 is a 3D centroid. The centroid 204 may be associated with the object's true location.

In general, the clustered nodes 202 are location estimates of a same object or a same class of objects. For example, in an office, a location of office furniture may be less dynamic than a location of office supplies, such as pens or paper. The nodes 202 within an area of a location may be clustered. For example, the nodes 202 corresponding to a location of an office chair may form a cluster if the location is within a specific area over the course of the observations. The 3D centroid 204 (e.g., mean centroid) may be determined for each cluster.

For density based clustering, accuracy of the object location estimates may be determined based on the 3D centroid 204 of each cluster. Estimating an object's location based on the 3D centroid 204 may improve the accuracy of the estimation. Additionally, the object localization functions accuracy may be determined based on a 3D standard deviation of each cluster. The 3D mean of each cluster may be used to estimate an object's true location. The standard deviation may be used to determine the variance of a cluster. When the standard deviation is greater than a threshold, there may be uncertainty in an object's true location. The uncertainty in the object's location decreases when a variance in the standard deviation decreases. As such, the standard deviation correlates to an accuracy of the object's location.

Figure 3:
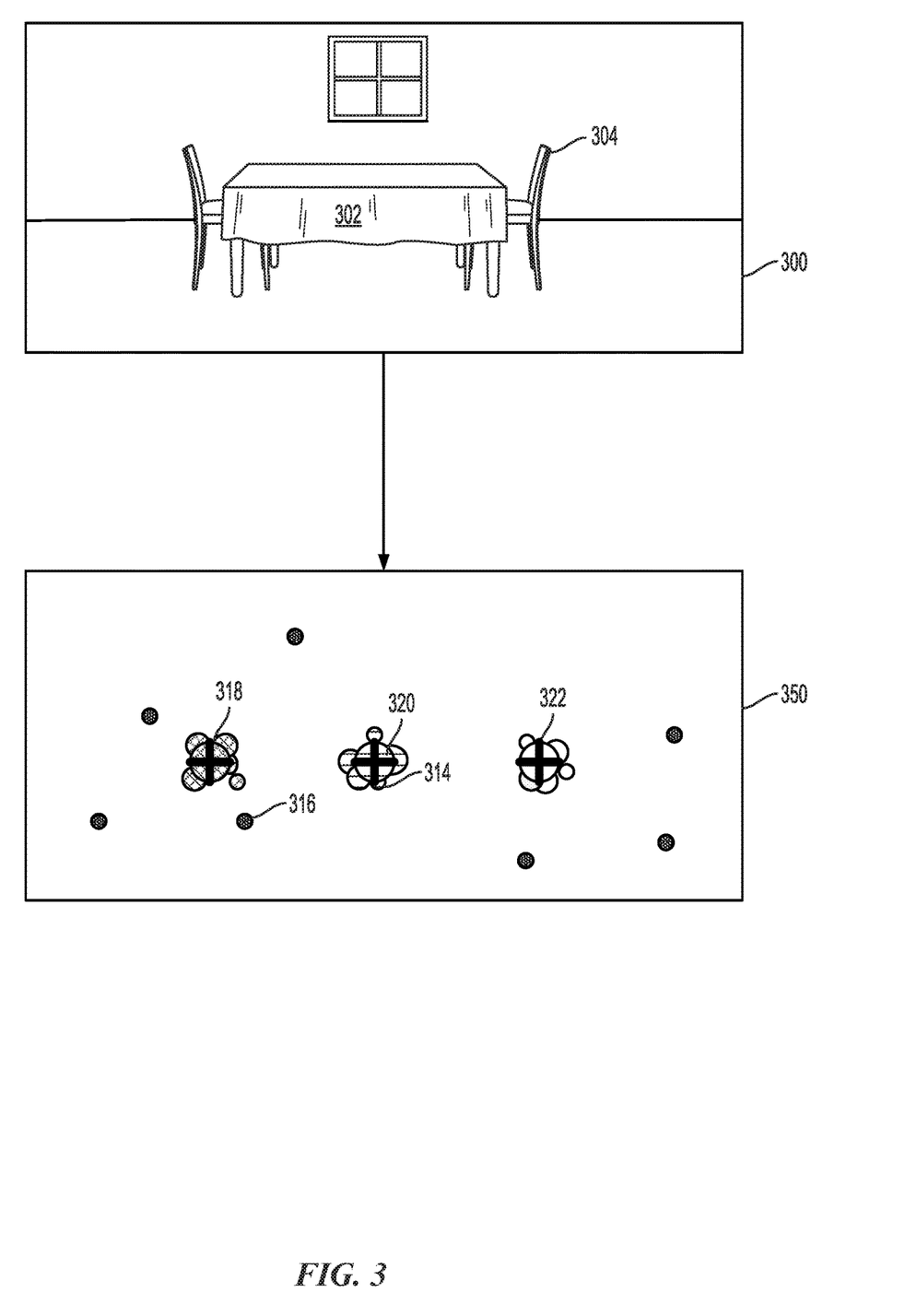
FIG. 3 illustrates an example of generating a clustering analysis map of object locations in an environment by observing object locations over time.

FIG. 3 illustrates an example of generating a clustering analysis map 350, according to aspects of the present disclosure. As shown in FIG. 3, the clustering analysis map 350 is based on observations of objects 302, 304 in an environment 300. In FIG. 3, a robot may observe the location of the objects (e.g., chairs 304 and table 302) in the environment 300 over a period of time. The robot may localize the locations of the chairs 304 and the table 302 for each observation.

After a number of observations, the robot may perform a clustering analysis to generate a clustering analysis map 350. The clustering analysis map 350 includes in-clustered nodes 314 and non-clustered nodes 316. The non-clustered nodes 316 are isolated observations from the environment 300. The in-clustered nodes 314 may be considered repeated observations of the same object 304, 302. Each centroid 318, 320, 322 is considered a true object location. For example, centroids 318, 322 correspond to the estimated true location of the chairs 304. Centroid 320 corresponds to the estimated true location of the table 302. The centroids 318, 320, 322 may be 3D centroids.

False positives are common in conventional convolutional neural network detectors. The clustering analysis (e.g., density based clustering) improves an estimate of a number of objects in a spatial environment, thereby reducing false positives. Density based clustering may be used to set density criteria for multiple detections in a similar, or same, location. As such, repeated observations of the same object may be considered. That is, in one configuration, density based clustering is used to consider multiple observations and discard isolated observations. Additionally, density based clustering may fuse repeated observations into unified object instances. Each cluster represents an instance of an object, such as a bottle or a plant.

In the example of FIG. 2, each cluster corresponds to one object based on multiple observations of the object. For example, hundreds or thousands of individual detections of the objects may be used for each cluster. Additionally, the clustering analysis may be used to determine a quality of the location estimations. That is, the clustering analysis may determine how well the location estimators are performing.

In one configuration, by observing object locations over time, a probability distribution of object locations in an environment may be generated. That is, the probability density function (e.g., probability density analysis) estimates a continuous distribution using the set of observations to represent the probability of finding an object at any given location on a map. Accordingly, the probability density function may be used to represent spatial and temporal knowledge about objects in the spatial environment.

A memory footprint of the data corresponding to the estimated probability density function is less than a memory footprint for data corresponding to conventional object localization systems. For example, conventional object localization systems may generate a 1 GB object observation log. In contrast, the estimated probability density function may be 50 KB. Due to the reduced memory footprint, the kernel density estimation may be transferred between robotic devices. As such, robotic devices may share knowledge about object locations in an environment.

As discussed, the probability density function analysis estimates a continuous distribution using all of the observations configurations. The probability distribution of object locations in an environment is generated by observing object locations over time. Random samples may be extracted from the probability distribution. A random sample from the distribution may have a higher likelihood of being in an area of high probability as opposed to an area of low probability. Additionally, evaluating the distribution over the map grid may provide a heat map (e.g., cost map) showing areas of the map that are more likely to contain objects.

A robotic device may sample areas of high probability to reduce a search time for an object. If the object is not in the high probability area (e.g., a most likely location), the object search may then sample areas of low probability. The probability distribution may reduce search times by distinguishing high probability and low probability areas. In one configuration, if an object is found in an unlikely location (e.g., low probability area), the robot device may place the object back in a most likely location (e.g., high probability area).

As another example, specific objects may correspond to specific high probability and low probability areas. For example, a first set of chairs are for a kitchen dining table, and a second set of chairs are for a formal dining table. In this example, the kitchen is a high probability area for the first set of chairs and an area outside of the kitchen is a low probability area. For example, the formal dining room may be a low probability area for the first set of chairs. Additionally, the formal dining room is a high probability area for the second set of chairs and the kitchen is a low probability area for the second set of chairs.

Figure 4A:
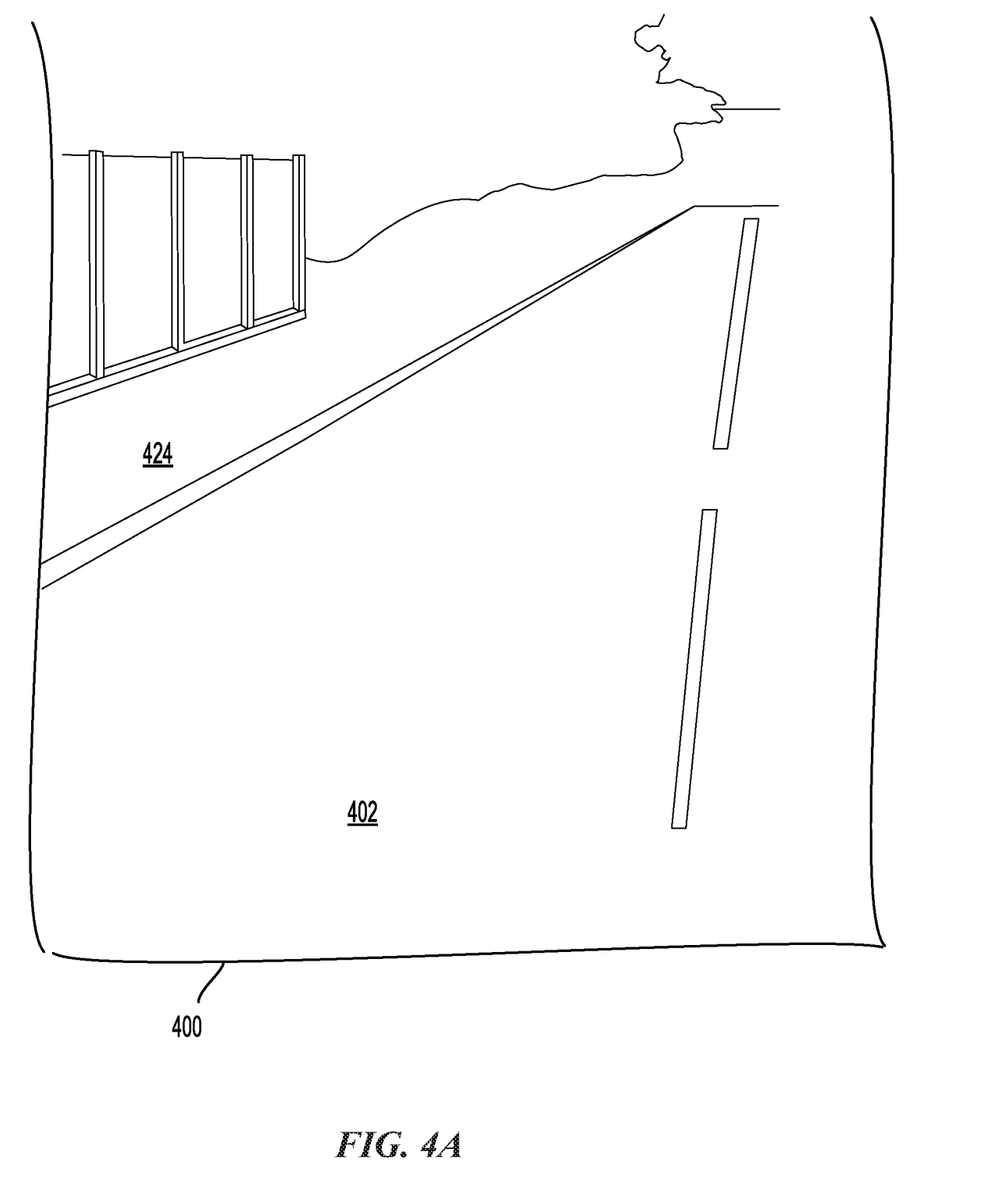
FIG. 4A illustrates an example of an environment according to aspects of the present disclosure.

FIG. 4A illustrates an image of an environment 400, according to aspects of the present disclosure. In the example of FIG. 4A, the environment 400 includes a road 402 and a sidewalk 424. In one configuration, a robot observes the environment 400 over time. For example, the robot may observe the environment 400 over a twenty-four hour period. Based on the observations, the robot generates a probability distribution of object locations in the environment 400. The objects may be humans or another type of object. The probability distributions may be used to generate a cost map.

Figure 4B:
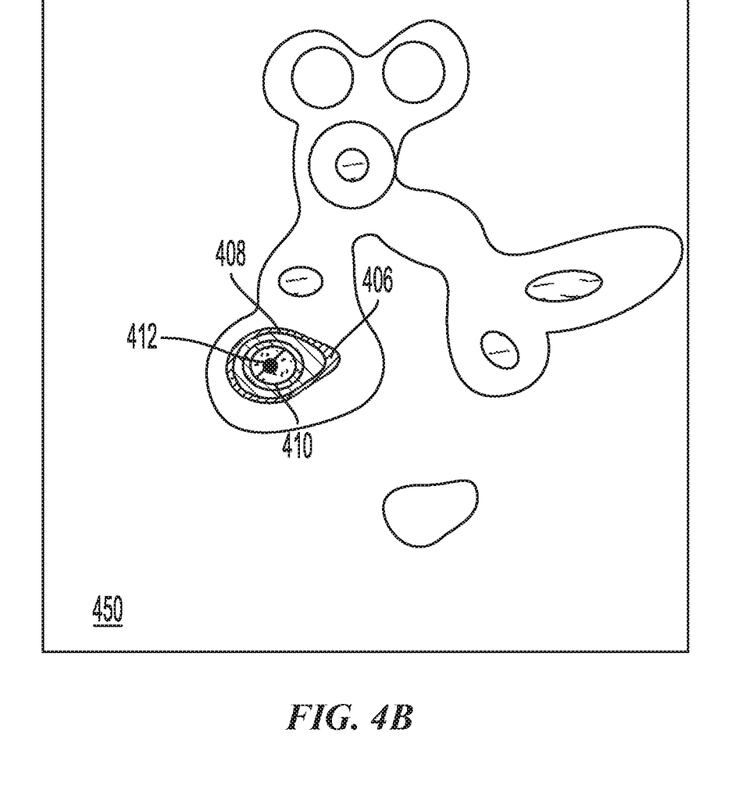
FIG. 4B illustrates an example of a cost map according to aspects of the present disclosure.

As shown in FIG. 4B, a cost map 450 may be generated based on a probability density analysis of objects in an environment. The cost map 450 may be based on a 2D or 3D probability density function. As such, any type of map, such as an ego view or top-down view, may be generated.

In the cost map 450, low probability areas may be distinguished from high probability areas. Each area may be assigned a probability value. The probability value, or probability value range, may be visualized by color or other visual representation. For example, a color or shading of low probability areas may be different from high probability areas. Different granularity levels may be assigned to an occupancy probability. For example, as shown in FIG. 4B, the probability areas may be low 404, mild 406, medium 408, high 410, or very high 412. The probability of an object being present at a location may be determined from a value assigned to the location in the cost map. The probability of an object being present at a location may be referred to as an object probability.

Figure 4C:
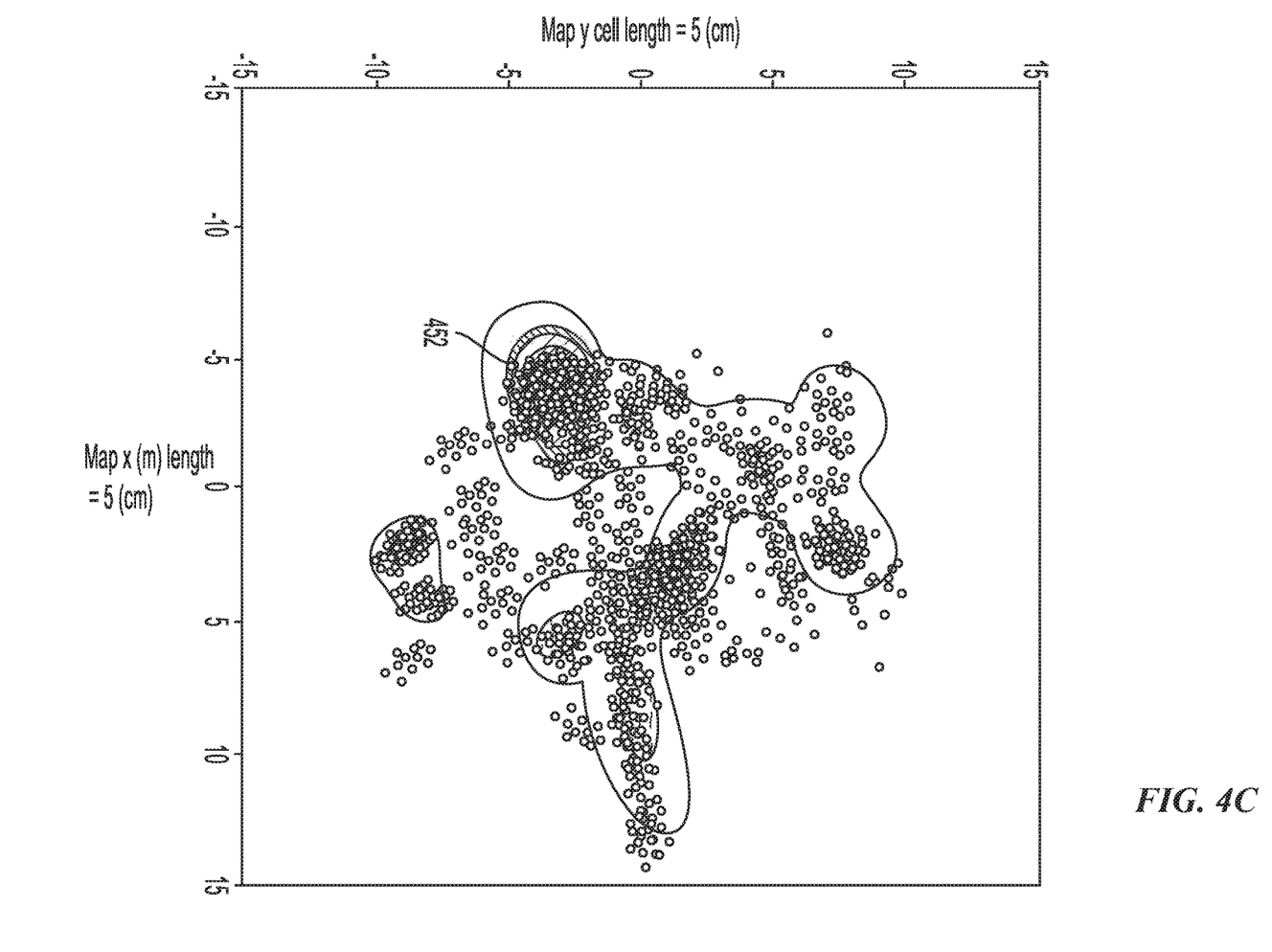
FIG. 4C illustrates an example of a cost map with object locations integrated over a time period according to aspects of the present disclosure.

FIG. 4C illustrates an example of the cost map 450 with object locations 452 integrated over a time period. In the example of FIG. 4C, the time period may be a twenty-four hour period. Other time periods, such as hours, days, weeks, months, etc., are also contemplated.

In the example of FIG. 4C, each object location 452 represents the location of an object, such as a human. The cost map 450 is generated based on a probability density analysis. As discussed, the probability density analysis estimates a continuous distribution using all of the observations in order to represent the probability of finding an object at any given location on the cost map 450. The cost map may be considered a Gaussian mixture model with some number of 2D Gaussian functions fit to the data.

Each object or object type may correspond to specific high probability and low probability areas. For example, for kitchenware in a home environment, a high probability may be the kitchen and a low probability area may be a bathroom. As another example, for clothes in a home environment, a high probability area may be one or more closets and a low probability area may be the kitchen. According to aspects of the present disclosure, a robotic device may return objects in the environment to their "home" location (e.g., high probability area) without user instruction or user intervention.

As discussed, cost maps may be generated from probability distributions. The cost maps may be overlaid over a map of an environment. An accurate spatio-temporal probability density function for where objects are likely to be found within an environment enables automatic detection of objects in unlikely places. For example, the object detection system may automatically detect that a human is found in an unlikely place.

The detection is based on the location in the environment and/or an object's pose. For example, a human is likely to stand in a kitchen and the human is unlikely to lie down in the kitchen. As another example, the human is likely to stand at the bottom of the stairs and is unlikely to lie down at the bottom of the stairs.

As discussed, in one configuration, an object detection system generates a probability distribution for locations of one or more objects, such as a human, by observing locations of the object over time. For simplicity, a human will be used as an example of an object. Still, aspects of the present disclosure are not limited to detecting humans and are contemplated for other objects.

The object detection system may be a component of a robot or an environment monitoring system, such as a home security camera. If the object is identified at a location that is different from one of the acceptable locations, the system, or robot, may generate an alert. For example, the alert may be a call for emergency services. In addition, if the object is not identified at the acceptable locations, the robot may initiate searching for the human.

For example, based on observed locations of a human in an environment, the system generates a probability distribution for acceptable locations (e.g., likely locations) where the human may be immobile for a time period that is greater than a threshold. The acceptable locations may correspond to probability areas (e.g., location probabilities) that are greater than a threshold, such as medium 408, high 410, and/or very high 412 (see FIGS. 4B-C). The unacceptable locations (e.g., unlikely locations) may correspond to probability areas (e.g., location probabilities) that are less than a threshold, such as low 404 and/or mild 406.

As discussed above, locations that are different from the acceptable locations may be referred to as unlikely locations. The acceptable locations may also be referred to as likely locations. For example, the floor in a hallway is an unlikely location for an immobile human. After determining the acceptable locations, the system may monitor the environment.

Upon detecting an object in an unlikely location, the system may generate an alert. In one configuration, the system also determines the time the object has been in the unlikely location. If the time period is greater than the threshold, the system may generate an alert. For example, an alert may be generated if a human is immobile at an unlikely location for a time period that is greater than a threshold.

The alert may trigger one or more actions. In one configuration, the alert may trigger a robot to initiate verbal interaction with the human. Additionally, or alternatively, the robot may call emergency contacts for telepresence evaluation. The robot may also attempt to move the human to an acceptable location. The alert may also trigger the robot to perform emergency services, such as chest compressions.

According to aspects of the present disclosure, a system observes the patterns of people and the space they occupy at any given time. The system may actively look for a human if the human is not at an expected location. If the human is then found in an unresponsive state, the system or robot may contact emergency services.

Figure 5:
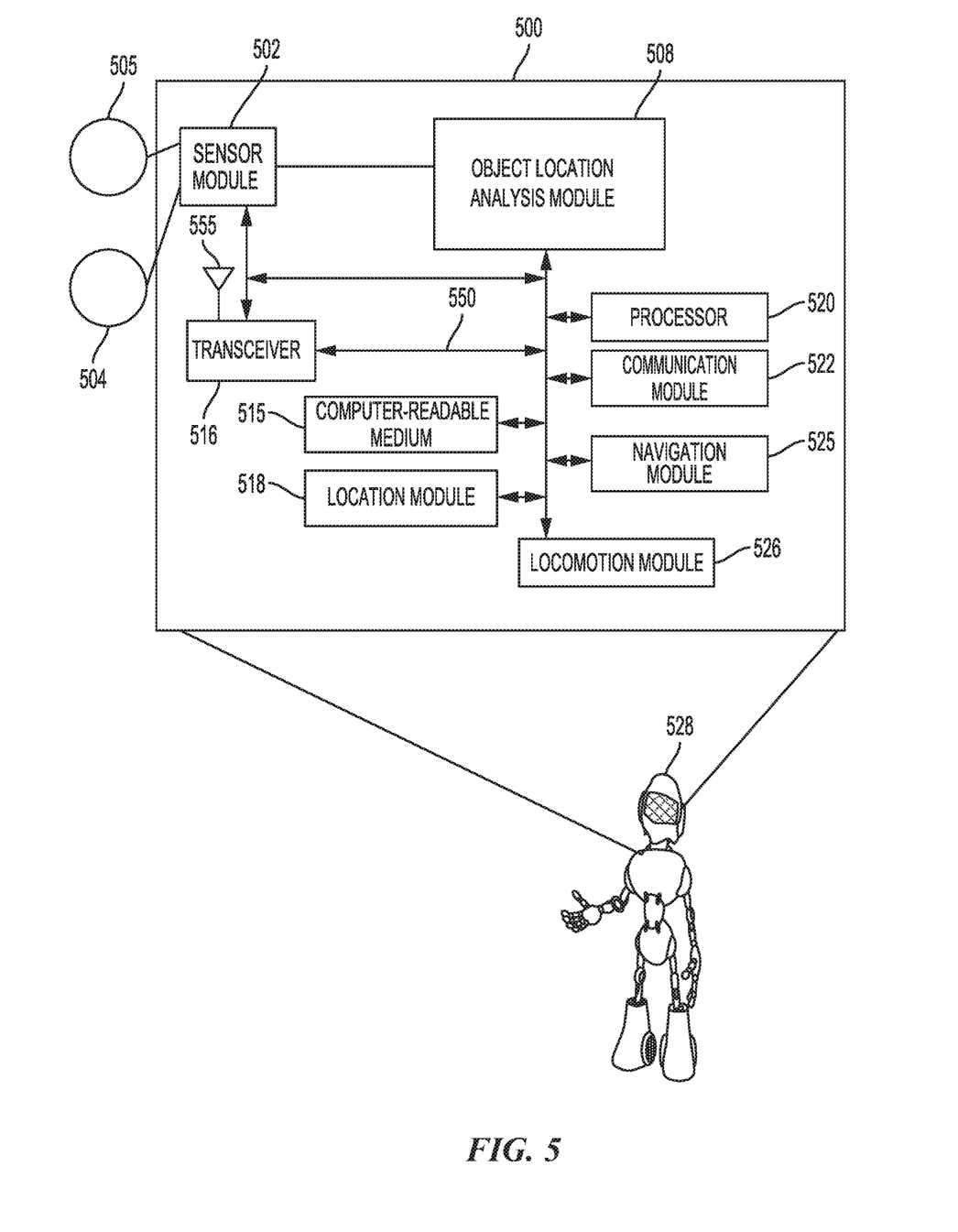
FIG. 5 is a diagram illustrating an example of a hardware implementation for an object location system according to aspects of the present disclosure.

FIG. 5 is a diagram illustrating an example of a hardware implementation for an object location system 500, according to aspects of the present disclosure. The object location system 500 may be a component of a vehicle, a robotic device, or another device. For example, as shown in FIG. 5, the object location system 500 is a component of a robot 528 (e.g., robotic device).

Aspects of the present disclosure are not limited to the object location system 500 being a component of the robot 528. Other devices, such as a bus, boat, drone, or vehicle, are also contemplated for using the object location system 500. The robot 528 may operate in at least an autonomous operating mode and a manual operating mode.

The object location system 500 may be implemented with a bus architecture, represented generally by a bus 550. The bus 550 may include any number of interconnecting buses and bridges depending on the specific application of the object location system 500 and the overall design constraints. The bus 550 links together various circuits including one or more processors and/or hardware modules, represented by a processor 520, a communication module 522, a location module 518, a sensor module 502, a locomotion module 526, a navigation module 525, and a computer-readable medium 515. The bus 550 may also link various other circuits such as timing sources, peripherals, voltage regulators, and power management circuits, which are well known in the art, and therefore, will not be described any further.

The object location system 500 includes a transceiver 516 coupled to the processor 520, the sensor module 502, an object location analysis module 508, the communication module 522, the location module 518, the locomotion module 526, the navigation module 525, and the computer-readable medium 515. The transceiver 516 is coupled to an antenna 555. The transceiver 516 communicates with various other devices over a transmission medium. For example, the transceiver 516 may receive commands via transmissions from a user or a remote device. As another example, the transceiver 516 may transmit statistics and other information from the object location analysis module 508 to a server (not shown).

The object location system 500 includes the processor 520 coupled to the computer-readable medium 515. The processor 520 performs processing, including the execution of software stored on the computer-readable medium 515 providing functionality according to the disclosure. The software, when executed by the processor 520, causes the object location system 500 to perform the various functions described for a particular device, such as the robot 528, or any of the modules 502, 508, 515, 516, 518, 520, 522, 525, 526. The computer-readable medium 515 may also be used for storing data that is manipulated by the processor 520 when executing the software.

The sensor module 502 may be used to obtain measurements via different sensors, such as a first sensor 506 and a second sensor 505. The first sensor 506 may be a vision sensor, such as a stereoscopic camera or a red-green-blue (RGB) camera, for capturing 2D images. The second sensor 505 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 505, 506.

The measurements of the first sensor 506 and the second sensor 505 may be processed by one or more of the processor 520, the sensor module 502, the object location analysis module 508, the communication module 522, the location module 518, the locomotion module 526, the navigation module 525, in conjunction with the computer-readable medium 515 to implement the functionality described herein. In one configuration, the data captured by the first sensor 506 and the second sensor 505 may be transmitted to an external device via the transceiver 516. The first sensor 506 and the second sensor 505 may be coupled to the robot 528 or may be in communication with the robot 528.

The location module 518 may be used to determine a location of the robot 528. For example, the location module 518 may use a global positioning system (GPS) to determine the location of the robot 528. The communication module 522 may be used to facilitate communications via the transceiver 516. For example, the communication module 522 may be configured to provide communication capabilities via different wireless protocols, such as WiFi, long term evolution (LTE), 5G, etc. The communication module 522 may also be used to communicate with other components of the robot 528 that are not modules of the object location system 500.

The locomotion module 526 may be used to facilitate locomotion of the robot 528. As another example, the locomotion module 526 may be in communication with one or more power sources of the robot 528, such as a motor and/or batteries. The locomotion may be proved via wheels, moveable limbs, propellers, treads, fins, jet engines, and/or other sources of locomotion.

The object location system 500 also includes the navigation module 525 for planning a route or controlling the locomotion of the robot 528, via the locomotion module 526. A route may be planned based on data provided via the object location analysis module 508. The modules may be software modules running in the processor 520, resident/stored in the computer-readable medium 515, one or more hardware modules coupled to the processor 520, or some combination thereof.

The object location analysis module 508 may be in communication with the sensor module 502, the transceiver 516, the processor 520, the communication module 522, the location module 518, the locomotion module 526, the navigation module 525, and the computer-readable medium 515. In one configuration, the object location analysis module 508 receives sensor data from the sensor module 502. The sensor module 502 may receive the sensor data from the first sensor 506 and the second sensor 505. According to aspects of the present disclosure, the sensor module 502 may filter the data to remove noise, encode the data, decode the data, merge the data, extract frames, or perform other functions. In an alternate configuration, the object location analysis module 508 may receive sensor data directly from the first sensor 506 and the second sensor 505.

In one configuration, the object location analysis module 508 determines a probability areas for objects based on information from the processor 520, the location module 518, the computer-readable medium 515, the first sensor 506, and/or the second sensor 505. The probability areas may be determined by generating a probability distribution of the object locations for the observed objects. Based on the probability areas, the object location analysis module 508 may control one or more actions of the robot 528.

For example, the action may be providing assistance to an object, such as lifting an immobile object or communicating with the object. Additionally, or alternatively, the action may include contacting emergency services. The object location analysis module 508 may perform the action via the processor 520, the location module 518, communication module 522, the computer-readable medium 515, the locomotion module 526, and/or the navigation module 525.

Figure 6:
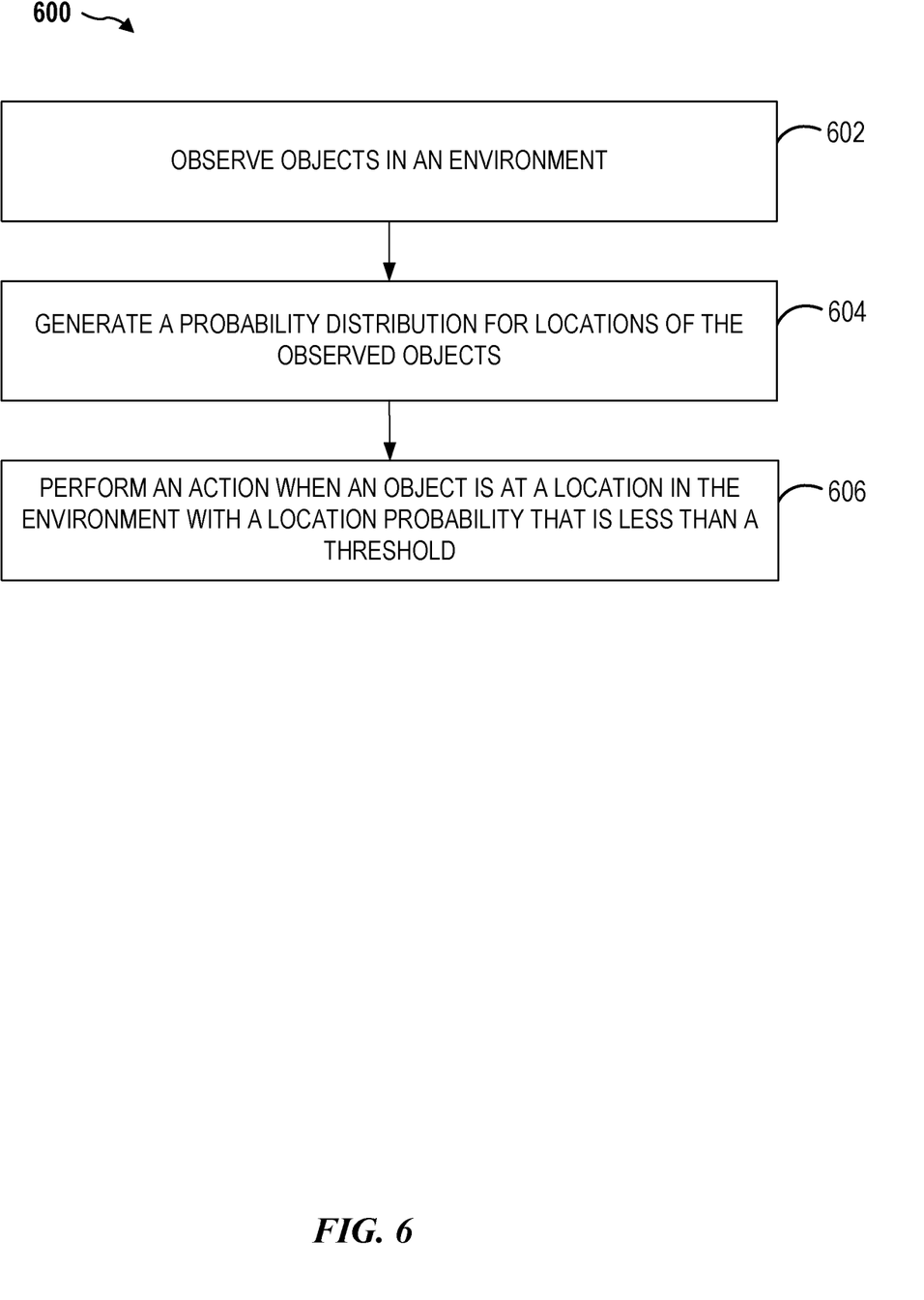
FIG. 6 illustrates a flow diagram for controlling a robotic device based on observed object locations according to aspects of the present disclosure.

FIG. 6 illustrates a flow diagram 600 for controlling a robotic device based on observed object locations according to aspects of the present disclosure. For simplicity, the robotic device will be referred to as a robot. As shown in FIG. 6, at block 602 the robot observes objects in an environment. The objects may be observed via one or more sensors of the robot, such as LiDAR, RADAR, and/or an RGB camera. The objects may be observed over a period of time, such as hours, days, etc.

At block 604, the robot generates a probability distribution for locations of the observed objects. In one configuration, the robot estimates a continuous distribution using the observations of the objects over the period of time. In this configuration, the probability distribution is based on the continuous distribution.

A cost map may be generated from the probability distribution. The cost map may also be referred to as a heat map. The cost map may be overlaid on a map of the environment. The cost map may be a 2D or 3D cost map.

At block 606, the robot performs an action when an object is at a location in the environment with a location probability that is less than a threshold. The robot may perform the action based on the cost map. As an example, the robot may assist the object and/or contact emergency services. For example, if the robot identifies a human in an unlikely location (e.g., a location with a location probability that is less than a threshold) the robot may contact emergency services.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling a robotic device based on observed object locations, comprising:
    observing a set of objects in an environment over a period of time prior to a current time;
    generating a probability distribution for locations of each object of the set of objects in the environment based on observing the set of objects over the period of time;
    identifying, at the current time, an object of the set of objects at a location in the environment;
    determining a probability of the object being at the location in the environment based on identifying the object at the location, the probability being based on the probability distribution associated with the object for the location; and
    controlling the robotic device to perform an action based on the probability being less than a threshold.

2. The method of claim 1, further comprising estimating a continuous distribution using the observations of the objects over the period of time.

3. The method of claim 2, in which the probability distribution is based on the continuous distribution.

4. The method of claim 1, further comprising:
    generating a cost map from the probability distribution;
    overlaying the cost map on the environment; and
    controlling the robotic device based on the cost map.

5. The method of claim 4, in which the action comprising at least one of providing assistance to the object, contacting emergency services, or a combination thereof.

6. The method of claim 1, in which the object is a human.

7. The method of claim 1, in which the location is an unlikely location for the object based on the probability being less than the threshold.

8. An apparatus for controlling a robotic device based on observed object locations, the apparatus comprising:
    a memory; and
    at least one processor coupled to the memory, the at least one processor configured:
        to observe a set of objects in an environment over a period of time prior to a current time;
        to generate a probability distribution for locations of each object of the set of objects in the environment based on observing the set of objects over the period of time;
        to identify, at the current time, an object of the set of objects at a location in the environment;
        to determine a probability of the object being at the location in the environment based on identifying the object at the location, the probability being based on the probability distribution associated with the object for the location; and
        to control the robotic device to perform an action based on the probability being less than a threshold.

9. The apparatus of claim 8, in which the at least one processor is further configured to estimate a continuous distribution using the observations of the objects over the period of time.

10. The apparatus of claim 9, in which the probability distribution is based on the continuous distribution.

11. The apparatus of claim 8, in which the at least one processor is further configured:
    to generate a cost map from the probability distribution;
    to overlay the cost map on the environment; and
    to control the robotic device based on the cost map.

12. The apparatus of claim 11, in which the action comprising at least one of providing assistance to the object, contacting emergency services, or a combination thereof.

13. The apparatus of claim 8, in which the object is a human.

14. The apparatus of claim 8, in which the location is an unlikely location for the object based on the probability being less than the threshold.

15. A non-transitory computer-readable medium having program code recorded thereon for controlling a robotic device based on observed object locations, the program code executed by a processor and comprising:
    program code to observe a set of objects in an environment over a period of time prior to a current time;
    program code to generate a probability distribution for locations of each object of the set of objects in the environment based on observing the set of objects over the period of time;
    program code to identify, at the current time, an object of the set of objects at a location in the environment;
    program code to determine a probability of the object being at the location in the environment based on identifying the object at the location, the probability being based on the probability distribution associated with the object for the location; and
    program code to control the robotic device to perform an action based on the probability being less than a threshold.

16. The non-transitory computer-readable medium of claim 15, in which the program code further comprises program code to estimate a continuous distribution using the observations of the objects over the period of time.

17. The non-transitory computer-readable medium of claim 16, in which the probability distribution is based on the continuous distribution.

18. The non-transitory computer-readable medium of claim 15, in which the program code further comprises:
    program code to generate a cost map from the probability distribution;
    program code to overlay the cost map on the environment; and program code to control the robotic device based on the cost map.

19. The non-transitory computer-readable medium of claim 18, in which the action comprising at least one of providing assistance to the object, contacting emergency services, or a combination thereof.

20. The non-transitory computer-readable medium of claim 15, in which the location is an unlikely location for the object based on the probability being less than the threshold.

* * * * *